United States Patent [19]

Shirey

[11] 4,215,767
[45] Aug. 5, 1980

[54] PARKING BRAKE DEVICE

[75] Inventor: Frank W. Shirey, N. Huntingdon, Pa.

[73] Assignee: Westinghouse Air Brake Company, Wilmerding, Pa.

[21] Appl. No.: 932,591

[22] Filed: Aug. 10, 1978

[51] Int. Cl.² ............................................. B60T 17/16
[52] U.S. Cl. ..................................... 188/265; 303/89
[58] Field of Search ............... 74/470; 91/45; 60/371, 60/406, 435, 437, 568; 188/67, 265, 170, 153; 303/89

[56] References Cited

U.S. PATENT DOCUMENTS

| | | | |
|---|---|---|---|
| 3,035,666 | 5/1962 | Beeskow | 188/217 |
| 3,228,729 | 1/1966 | Schubert | 303/89 X |
| 3,410,610 | 11/1968 | Cumming | 303/89 X |

Primary Examiner—Duane A. Reger
Attorney, Agent, or Firm—R. S. Visk; R. W. McIntire, Jr.

[57] ABSTRACT

A combined fluid pressure operable running and parking vehicle brake device including an application piston responsive to fluid pressure for exerting a brake-applying force on a vehicle wheel through a brake shoe for effecting either a service or emergency application, a locking piston responsive to fluid pressure independently of the application piston, for locking the brake device in an application disposition when the vehicle is parked, and compressible springs placed under compression by actuation of the application piston for storing a compressive force available for providing the brake-applying force in the event of failure of fluid pressure when the vehicle is parked.

6 Claims, 2 Drawing Figures

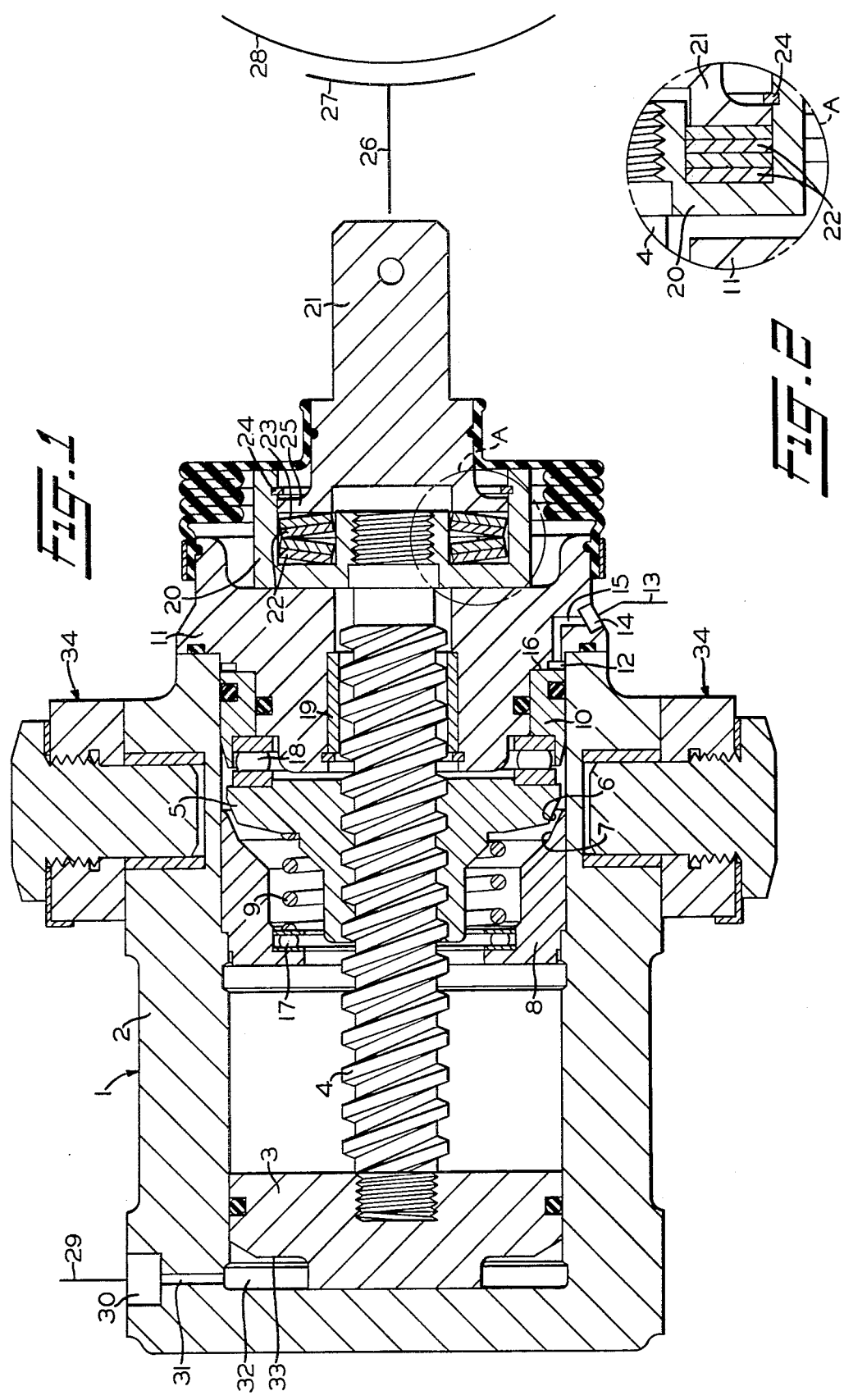

PARKING BRAKE DEVICE

BACKGROUND OF THE INVENTION

Some of the presently known brake cylinder devices include, in addition to actuating piston means for providing service and emergency braking forces, parking brake means by which the brake cylinder, subsequently to having brought the vehicle to a stop, may be activated for locking the actuating piston in a brake-applied position and thus maintaining the brake shoe against the braking surface, such as the tread of a wheel. Since a vehicle wheel, especially a railway vehicle wheel, undergoes thermal expansion during braking, there is an attendant corresponding shrinkage as the wheel cools. This results in a tendency to reduce locked-up tension of the brake components and, thereby, a loss in parking brake effectiveness.

SUMMARY OF THE INVENTION

The principal object of the present invention, therefore, is to provide a vehicle wheel brake cylinder device including a parking brake portion provided with means for compensating for possible loss of parking brake effectiveness caused by loss of locked-up tension of the braking components such as might be caused by shrinkage of the wheel due to cooling off subsequently to a brake application during which the wheel may have expanded from braking heat.

Briefly, the invention is incorporated in a conventional brake cylinder device having an actuating or power piston responsive to fluid pressure for effecting either a service or emergency brake application, and a locking piston subjectable to fluid pressure, independently of said power piston, and operable responsively thereto for locking the power piston, through a friction clutch formed on a locking nut axially movable on a piston rod, in a brake-applied position, thus providing a parking brake. A pair of Belleville springs is disposed in a chamber formed between a spring seat member secured to the end of the piston rod and a shoulder formed on a piston rod extension axially displaceable relative to the piston rod. During such time that a brake application is made, the Belleville springs are compressed and placed under stress. If the vehicle is stopped and the parking brake applied, the stored-up tension in the Belleville springs is effective for exerting a back-up force on the brake shoe in the event that some effectiveness of the force provided by the power piston is lost due to wheel shrinkage as it cools off.

BRIEF DESCRIPTION OF THE DRAWINGS

FIG. 1 is an elevational view, in section, of a brake cylinder device embodying the invention; and FIG. 2 is a fragmentary view, in section and on a larger scale, of certain components shown in area A of FIG. 1, when in a brake-applied disposition.

DESCRIPTION AND OPERATION

As shown in FIG. 1 of the drawing, a brake cylinder device 1 embodying the invention comprises a cylindrical casing 2 closed at one end in which a power piston 3 is reciprocably operable. A piston rod in the form of a fast-pitch screw 4 is secured by one end to power piston 3 and extends coaxially through casing 2 away from said power piston, said screw carrying thereon a lock nut 5 having peripherally formed thereon an external conical friction locking surface. Locking surface 6 is intended to be operably engageable with a complementary internal conical locking surface 7 formed peripherally on a locking member 8 coaxially fixed in casing 2. A spring 9 is compressedly disposed between lock nut 5 and locking member 8 for biasing said lock nut toward a disengaged or free position in which locking surfaces 6 and 7 are disengaged.

A locking piston 10 is reciprocably disposed in casing 2 adjacent a casing end portion 11 sealingly secured in an open end of said casing opposite the closed end thereof. Locking piston 10 is sealingly isolated from casing 2 and casing end portion 11, and is effective, when subjected to fluid pressure supplied to an actuating chamber 12 via a pipe 13, a port 14, and a passageway 15, and acting on a pressure area 16 of said piston adjacent said chamber, for moving lock nut 5 to an engaged position in which locking surfaces 6 and 7 are engaged for locking said lock nut against rotation on screw 4. Pipe 13 may be considered a fluid pressure source.

Respective ball bearing races 17 and 18 are disposed between the base of locking member 8 and the adjacent end of spring 9 and between lock nut 5 and locking piston 10 for facilitating spinning of said lock nut on screw 4 when the lock nut is in its free position. Screw 4 is fixed against rotation.

The free end of screw 4 opposite the end secured to power piston 3 extends coaxially through a guide bushing 19 coaxially secured in casing end portion 11. A cup-like spring holder or carrier 20 is coaxially secured to the free end of screw 4 with the open end of said spring holder facing outwardly from cylinder device 1 for coaxially slidably receiving a piston rod extension 21.

A plurality of Belleville springs 22 of the usual variety having respective convex and concave sides, in this case comprising a pair of such springs, are disposed in an annular spring chamber 23 formed cooperatively by spring holder 20 and the adjacent inner end of rod extension 21. The pair of Belleville springs 22 is arranged with the respective concave sides thereof in facing relation to each other. Springs 22 urge piston rod extension 21 in a right-hand or outward direction relative to cylinder device 1, such outwardly directed movement being limited by a snap ring 24 disposed in spring holder 20 and engageable by an annular flange 25 formed on the inner end of said piston rod extension.

Piston rod extension 21 is connected by suitable linkage 26 (represented by a solid line) to a brake shoe 27, which is engageable with the tread of a railway vehicle wheel 28.

In operation, in order to make a brake application, operating fluid pressure is supplied via a pipe 29, a port 30, and a passageway 31 to an operating chamber 32 formed in casing 2 adjacent a pressure face 33 on the left-hand side (as viewed in the drawing) of power piston 3 for operating said power piston to a brake application position, so that the force thus exerted thereby is transmitted through screw 4, spring holder 20 (into which the right-hand end of said screw 4 is secured), Belleville springs 22, piston rod extension 21, and linkage 26 to the brake shoe 27. Brake shoe 27 is consequently operated to a brake-applying position in which braking force is exerted on wheel 28. Pipe 29 may be considered a fluid pressure source.

Although any suitable type of fluid pressure medium such as compressed air, for example, may be used, hydraulic fluid pressure is preferred, however, for operating the type of brake cylinder employed herein for illustrating the application of the invention. Brake cylinder device 1 is the type normally used with a so-called snow brake or zero-clearance brake in which brake shoe 27 normally rides in contact with the tread of wheel 28, even in a brake-released situation, but, in which case, with a minimum or practically no pressure. Wheel 28 is thus kept clear of moisture, ice, snow, or other debris that could impair braking effectiveness or traction.

When operating chamber 33 is pressurized, power piston 3, screw 4, and spring holder 20 are all moved rightwardly. Since screw 4 is a fast-pitch screw, lock nut 5, during such movement, turns relative to said screw to remain in an unlocked position in abutment with bearing 18 and with surfaces 6 and 7 disengaged, as shown in FIG. 1. Bearing 18 is retained in abutting relation with lock nut 5 and locking piston 10, but permits relative rotation therebetween. Belleville springs 22 are thus compressed to urge flange 25 of piston rod extension 21 into abutting contact with snap ring 24. As the force of pressure in chamber 33 continues, such force is applied through brake shoe 27 to wheel 28. The Belleville springs 22 are thus caused to collapse to form a solid spring unit with stored-up compressive energy. See FIG. 2.

If it is desired to set the parking brake, actuating chamber 12 is charged with fluid pressure which acts on pressure area 16 of locking piston 10. Locking piston 10 is thereby moved leftwardly and causes similar movement of locking nut 5, which is able to spin on screw 4 until locking surfaces 6 and 7 are engaged. Screw 4, spring holder 20, piston rod extension 21, linkage 26, and brake shoe 27 are all locked in a brake-applied state, with the Belleville springs compressed into a solid disposition, as shown in FIG. 2.

As was hereinbefore noted, however, wheel 28, which may have expanded due to heat generated during the braking operation, may also contract or shrink as it cools while sitting still, so that under normal circumstances, the wheel would tend to move away from shoe 27 to thereby reduce the braking effectiveness. With the Belleville springs 22 compressed into a solid unit, however, the compressive energy stored up therein acts through piston rod extension 21 to maintain brake shoe 27 in tight contact with wheel 28 to thereby prevent loss of the parking brake.

A pair of oppositely arranged trunnions 34 is provided on casing 2 for securing the brake cylinder device 1 to some part of the vehicle such as the wheel truck frame (not shown).

From the above description, it should be apparent that the invention is applicable to disc type brakes as well as tread brakes.

Having now described the invention, what I claim as new and desire to secure by Letters Patent, is:

1. A parking brake device for use on a vehicle having a wheel and a brake shoe for applying a braking force to the wheel, said parking brake device comprising:
   (a) power piston means operable to a brake application position for effecting operation of the brake shoe to a brake-applying position in which a braking force is exerted on the wheel;
   (b) locking means for locking said power piston means in said brake application position; and
   (c) resilient means operable by movement of said power piston means to said brake application position to a compressed state for generating a compressive force acting in a direction coinciding with that of said braking force,
   (d) said compressive force being effective, in the event of loss of effectiveness of the power piston means, for maintaining the brake shoe in its said brake-applying position.

2. A parking brake device, as set forth in claim 1, wherein said power piston means comprises a power piston having a pressure face on one side thereof subjectable to fluid pressure, and a piston rod secured by one end to said power piston for transmitting said braking force.

3. A parking brake device, as set forth in claim 2, wherein said resilient means comprises a pair of Belleville springs.

4. A parking brake device, as set forth in claim 3, further characterized by:
   (a) a piston rod extension interconnected between the piston rod and the brake shoe; and
   (b) a cup-like spring carrier closed at one end and open at the opposite end and secured adjacent said closed end to the end of said piston rod opposite said one end of the piston rod in axial alignment therewith,
   (c) said piston rod extension having an annular flange formed at one end thereof slidably disposed in the open end of said spring carrier and having limited axial movement relative thereto,
   (d) said Belleville springs being carried in said spring carrier so as to be compressibly interposed between said flange and the closed end of said spring carrier.

5. A parking brake device, as set forth in claim 2, said piston rod is in the form of a fast-pitch screw fixed against rotation, and said locking means comprises:
   (a) a locking member axially fixed in the brake device and having formed thereon an annular internally disposed locking surface;
   (b) a lock nut coaxially screwably carried on said fast-pitch screw and normally free to spin thereon during reciprocal movement of the power piston and screw; and
   (c) a locking piston disposed in axial alignment with said locking nut and said locking member, and having formed thereon an externally disposed locking surface complementary to said internally disposed locking surface, said locking piston being effective, when subjected to fluid pressure for engaging and spinning said lock nut into a locking position in which said locking surfaces are engaged for locking up the power piston, the screw and the lock nut against further movement until the locking piston is relieved of fluid pressure acting thereon.

6. A parking brake device, as set forth in claim 4, wherein said pair of Belleville springs is disposed with respective concave sides thereof in facing relation to each other.

* * * * *